2,859,137

COATING TEXTILES WITH METHYL SILICONE RESIN AND N,N'-DIPHENYL GUANIDINE

Ray E. Ellis, Pasadena, Calif.

No Drawing. Application September 19, 1956
Serial No. 610,714

2 Claims. (Cl. 117—161)

This invention relates to a process of treating cellulosic and proteinaceous textiles and synthetic textiles such as nylon, Dacron, Orlon, Fortison, and rayon acetates to improve their properties, and to the improved materials thereby produced.

It is known that textile materials may be rendered water-repellant by treating them with alkyl-silicone halides in such a manner that these compounds react with the hydroxyl groups at the surface of the textile. The process must be carried out with great care, however, since the hydrogen halides produced will damage and weaken the material.

It is also known to treat textiles with other organosilicon derivatives to provide a water-repellant coating. Such derivatives may include polymers such as silicones. When these latter compounds are employed, it is at present generally necessary that the treated material be subjected to a further heat treatment in order to cure the polymer. This heat treatment is highly disadvantageous, for the textile or other materials will frequently be damaged at the temperatures employed, generally about 250 to 350° F. This is particularly true of the modern synthetic fabrics mentioned above. The industry has found that the use of certain catalysts such as Zinc Octosol, an 8% solution of zinc, will reduce the time of the exposure to these elevated temperatures. While the use of such a catalyst is an improvement over the prior art, close controls are still required to prevent damage to the substrate material, and some textiles will not withstand any treatment at these high temperatures. These textiles will tender or go off white on heating above 100° C. Generally, a heat cure is unsatisfactory and undesirable in itself in terms of the increased cost of operation and the necessity for ovens and heating controls.

It is an object of this invention to provide a superior process for improving the properties of the aforesaid textile materials.

A further object of this invention is to provide an improved process for treating the aforesaid materials with a silicone resin so as to make them water-repellant whereby the coating may be cured without resorting to a high temperature treatment.

It is a still further object of this invention to treat the aforesaid materials with a silicone resin in such a manner that other desired properties of the materials are retained.

Still another object of this invention is to provide water-repellant materials of the type set forth which result from the process of this invention.

Other objects of this invention will appear from the description of the invention as more particularly described herein.

This invention lies in the discovery that a silicone resin coating applied to a substrate material such as described above may be cured at room temperature, or at temperatures no greater than 100° C., by the use of a symmetrical N,N'-di-hydrocarbon-substituted guanidine as a catalyst. Preferably, the invention is carried out by adding a catalytic amount of a diphenyl guanidine to a solution of the silicone resin and then treating the substrate material with the resulting mixture by spraying or dipping.

Any of the polymeric silicone-resins which will impart water-repellant properties to a textile material may be used in the process of this invention. Such silicone resins include polyalkyl siloxanes as, for instance, Dow Corning Silicone No. 1107, a methyl, hydrogen polysiloxane. Polyethyl, polybutyl and other similar siloxanes are also effective. Still other silicones which may be used include polyethylphenyl, polymethylphenyl, and similar mixed polyalkylaryl siloxanes. The preferred silicone is polymethyl siloxane.

While the process of this invention may be carried out in various ways, the preferred technique is to prepare a solution of the silicone in a suitable solvent. As solvent, organic hydrocarbons have been found to be generally satisfactory, such as benzene, toluene, xylene, petroleum ether, and cyclohexane. Other solvents include ketones such as diethyl ketone, dibutyl ketone, and acetone; esters such as ethyl acetate, propyl acetate, and ethyl propionate; chlorinated hydrocarbons such as chloroform, trichloro ethylene and ethylene dichloride. The solvent should be relatively low boiling liquid, and petroleum ether and mineral spirits (which may contain aromatics) are advantageously employed. The composition of the solution may contain from 1% to 20% by weight of the silicone resin, preferably from 2% to 6% by weight. So far as can be determined, such a solution is stable under ordinary conditions of storage. One such solution containing about 6% by weight of silicone resin was kept in a closed container for about 60 days with no apparent reaction or separation taking place.

The diphenyl guanidine catalyst is preferably added in a solution to the above described silicone solution. It is, of course, necessary that the solvent for the guanidine be miscible in necessary proportions with the solvent used for the silicone. A number of such solvents may be employed but it is preferable to use methylethyl ketone, benzene, or cyclohexanol. When mineral spirits are used as the solvent for the silicone resin, one of the most satisfactory solvents for the catalyst is cyclohexanol. N,N'-disubstituted guanidines will not salt out of this solvent even after longer periods of time in storage. Generally the solution will comprise from 1% to 10% by weight of the guanidine, preferably from 2% to 6% by weight.

These two solutions are kept separate until it is desired to treat the textile or other substrate material. At that time suitable proportions of the solution are mixed so that the resulting mixture contains from 1% to 10% by weight of the guanidine catalyst to the silicone resin. When the cure is carried out at room temperature, it is desirable to use about 4% catalyst. Soon after the catalyst is added to the silicone solution a reaction takes place and in order to get the best results from the treatment, it is advantageous that the mixture be used within 10 to 20 hours from the time of its preparation. While results are not as good if the solution is kept longer, water-repellency has been achieved with a mixture prepared 100 hours before using.

It will be appreciated that the particular solvents employed in making up these solutions are not critical so long as the desired properties of volatility, solvent power for the respective solutes, and miscibility are present, and the solvent itself will not damage the textile material. For instance, ketonic solvents would not be used with the synthetic textiles.

In treating the materials, the above described silicone catalyst solution may be sprayed on the material or the material itself may be dipped therein. The surplus solution is removed either by wringing or mangling or similar extractive means. The treated material is then allowed to stand exposed to the air at room or moderately elevated temperatures up to 100° C. The solvent generally evaporates within 2 to 3 hours at room temperature, and under these conditions about 24 hours is required to completely cure the deposited silicone resin.

With an air cure such as this, results are achieved which are as good or better than those obtained from a heat cure employing catalysts such as Zinc Octosol. Using the processes of this invention, it has been found that a good water-repellant rating is achieved with a take-on of only 1% silicone resin on some fabric. The prior art processes generally require a higher deposit of the silicone resin.

If desired, the cure of the treated material may be accelerated by the employment of moderate temperatures such as 40° to 70° C. In no case are temperatures higher than 100° C. necessary although the use of higher temperatures will not prevent the curing process. A limited amount, such as 2%, by weight of silicone resin of an 8% Zinc Octosol solution may also be added, if desired, to the silicone/diphenylguanidine solution, in which case an excellent air cure is achieved.

It is to be understood that the term "moderate temperatures" as used herein refers to temperatures from about room temperature to no higher than 100° C.

In order that those skilled in the art may better understand the process of the present invention, the following illustrative examples are given, but it will be understood that the invention is not limited thereto:

*Example 1*

A solution was prepared by the dissolving of 6 parts of a polymethyl siloxane having a methyl to silicon ratio of 1.4:1 in 100 parts of mineral spirits (American Mineral Spirits Solvent No. 75B, containing about 65% aromatics). A separate solution was prepared by adding 6 parts of diphenylguanidine to 94 parts of cyclohexanol and the resulting mixture stirred until a clear solution was obtained. The catalyst solution was then added to the silicone resin solution with stirring to obtain an homogeneous mixture.

This solution was sprayed on a cotton fabric. The cotton fabric was wrung out to remove excess solution and then allowed to hang in the air at room temperature for 24 hours. At the end of that time the material was sprayed with water and the fabric was found to have excellent water-repellency characteristics as exhibited by the formation of large droplets on the surface. The increase in the weight of the fabric indicated that there was a take-up of about only 1% of the silicone resin.

*Example 2*

A solution of the silicone resin in mineral spirits was prepared as in Example 1 and 3 parts of the catalyst solution, prepared as in Example 1, were added thereto. A wool fabric was treated by dipping the material in a vat containing the resulting mixture. Surplus solution was then wrung out of the fabric which was allowed to hang in the air at room temperature for 24 hours. At the end of this time the treated material was found to have similar excellent water-repellency characteristics.

*Example 3*

The procedure employed in Example 1 was followed except that the silicone resin was a polyethyl siloxane having an ethyl to silicon ratio of 1.1:1. The solution was sprayed on a simple of Dacron fabric and the excess solution was wrung out. After curing on exposure to the air at room temperature for 24 hours, the surface had the highly improved water-repellant characteristics previously noted in Examples 1 and 2. It was also observed that otherwise the properties of the fabric were unchanged. Similar results were obtained in the use of other synthetic fabrics such as nylon, Orlon, and rayon acetates.

*Example 4*

A solution of polyethylphenyl siloxane was prepared by dissolving 8 parts of said siloxane in 100 parts trichloroethylene. A second solution of diphenyl guanidine was prepared by dissolving 8 parts of said guanidine in 100 parts of cyclohexanol. Five parts of this second solution were mixed with 100 parts of the silicone resin solution and the mixture allowed to stand for 3 hours. A Dacron sample was treated as in Example 3 with equivalent results being observed.

*Example 5*

A solution of polymethylphenyl siloxane (methyl to phenyl ratio of 2.6:13 carbon atom to silicon atom ratio of approximately 1.2:1) was prepared by dissolving 17 parts of the resin in 100 parts of acetone. A second solution containing 2 parts of diphenyl guanidine in 100 parts of methylethyl ketone was also prepared. Ten parts of the guanidine solution were added to 100 parts of the silicone resin solution and the mixture stirred. The resulting solution was then sprayed on a cotton fabric which was then wrung out to remove excess solution. The treated cotton was then hung in a heated room and exposed to air at a temperature of 60° C. After 24 hours of such treatment, the cure had gone to substantial completion and again the treated fabric was found to have highly superior water-repellant properties.

*Example 6*

The procedure followed was that used in Example 5 except that to the diphenyl guanidine solution one-half part of Zinc Octosol was also added. Only 5 parts of this solution were added to 100 parts of silicone resin solution. On exposure of the fabric to air at a temperature of 60° C., it was found that the cure was effected in 24 hours and that water-repellant properties were equivalent to those obtained in Example 5.

In addition to the above described techniques, it will be appreciated that the invention can be practiced utilizing a resin emulsion rather than a solution. Appropriate oil-in-water emulsions of silicones are well known in the art. Such an emulsion may be prepared by emulsifying a light hydrocarbon solution with sufficient water so that the final emulsion will contain from about 1% to about 20%, preferably from about 2% to about 6%, of silicone solids, such as a polymethyl siloxane. Added to this emulsion, and emulsified therewith, is a solution of the N,N'-disubstituted guanidine, preferably N,N'-diphenyl guanidine, in an amount such that there will be present about 1% to about 10%, preferably from about 2% to about 6%, by weight of the silicone resin, of the guanidine.

In the preparation of these emulsions, a high speed mixer is required with good shearing action. Suitable mixers include the type known as the Eppenbach mixer or a conventional colloid mill such as the Manton-Gaulin. The colloid mill should be set for minimum clearance in preparing the emulsion. The pH of the emulsion may be adjusted by the addition of ammonia if desired to attain the best results with a given fabric. The pH should normally be on the basic side, and the basic character of the guanidine catalyst will normally accomplish this. At any rate, this pH adjustment affects the take-up of the silicone itself by the fabric and is well within the skill of the art. When using emulsions of this character it is, of course, important to avoid the presence of wetting agents or sizing agents or similar materials on the fabric.

In treating a fabric such as described above, i. e., wool, cotton, or one of the synthetics, the same technique may be used with an emulsion as with a solution. For example, a wool fabric may be dipped in a petroleum ether-water emulsion of polymethyl siloxane containing 2% by weight of the resin and 3% of diphenyl guanidine. The cloth is then thoroughly wrung out and allowed to air-dry at 70° C. A highly water-repellant coating of the silicone is deposited which is fully cured after 24 hours without further treatment. As with the methods using a solution, the coating not only has highly effective water-repellant properties, but is retained through subsequent washing and dry-cleaning operations with the fabric.

Whether the solution or emulsion procedure is used, it can be seen that the cure is effected within about 24 hours at room temperature. At higher temperatures, the curing time will in general be decreased. For instance, at 100° C., about 30 minutes will usually be sufficient.

It will be appreciated that many additional modifications of the composition and processes described above will become apparent to one skilled in the art without departing from the scope of the invention which is limited only by the claims.

I claim:

1. A process for preparing and curing silicone resin-coated textile materials which comprises coating said textile materials with a methyl polysiloxane in an organic medium which also contains N,N'-diphenyl guanidine, wherein the ratio of methyl groups to silicon atoms in said polysiloxane is in the range of about 1.4 to 1 and said polysiloxane is present in an amount of about 1 to 20% by weight, said N,N'-diphenyl guanidine is present in an amount of from about 1% to about 10% by weight of said siloxane, and said organic medium consists essentially of a solvent selected from the group consisting of benzene, toluene, xylene, petroleum ether, cyclohexane, diethyl ketone, dibutyl ketone, acetone, ethyl acetate, propyl acetate, ethyl propionate, chloroform, trichloroethylene and ethylene dichloride, and thereafter allowing the coated textile material to dry at a temperature from about room temperature to about 100° C. and curing the polysiloxane coating.

2. The process of claim 1 wherein said polysiloxane is present in an amount from about 2% to about 6% by weight and said guanidine is present in an amount of about 4% by weight of said polysiloxane.

References Cited in the file of this patent

UNITED STATES PATENTS

| | | |
|---|---|---|
| 2,676,948 | Rowley | Apr. 27, 1954 |
| 2,728,743 | Warrick | Dec. 27, 1955 |
| 2,750,305 | Gagarine et al. | June 12, 1956 |